United States Patent
Hu et al.

(10) Patent No.: US 9,706,414 B2
(45) Date of Patent: Jul. 11, 2017

(54) METHOD AND APPARATUS FOR DETERMINING DATA FLOW RATE ON SERVICE ACCESS PORT

(71) Applicant: Huawei Technologies Co., Ltd., Shenzhen, Guangdong (CN)

(72) Inventors: Feng Hu, Shenzhen (CN); Jinlong Wu, Shenzhen (CN); Yining Wang, Shenzhen (CN); Yaoshun Xu, Shantou (CN); Jiandong Wu, Shantou (CN); Dongkai Zheng, Shantou (CN); Ling Li, Shantou (CN); Jian Lin, Shantou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 14/577,062

(22) Filed: Dec. 19, 2014

(65) Prior Publication Data
US 2015/0172157 A1  Jun. 18, 2015

Related U.S. Application Data

(63) Continuation of application No. PCT/CN2014/080878, filed on Jun. 26, 2014.

(30) Foreign Application Priority Data

Dec. 12, 2013  (CN) .......................... 2013 1 0687399

(51) Int. Cl.
*H04W 16/22* (2009.01)
*H04L 12/24* (2006.01)
(Continued)

(52) U.S. Cl.
CPC ......... *H04W 16/22* (2013.01); *H04L 12/2431* (2013.01); *H04L 41/0823* (2013.01);
(Continued)

(58) Field of Classification Search
None
See application file for complete search history.

(56) References Cited

U.S. PATENT DOCUMENTS 5,590,120 A * 12/1996 Vaishnavi ............. H04L 41/085
370/252
7,142,868 B1  11/2006 Broyles et al.
(Continued)

FOREIGN PATENT DOCUMENTS

CN  1487699 A  4/2004
CN  101056274 A  10/2007
(Continued)

OTHER PUBLICATIONS

Perez-Fontan et al., "Educational Cellular Radio Network Planning Software Tool," IEEE Transactions on Education, vol. 41, Issue 3, pp. 203-215, Institute of Electrical and Electronics Engineers, New York, New York (Aug. 1998).
(Continued)

*Primary Examiner* — Gary Mui
(74) *Attorney, Agent, or Firm* — Leydig, Voit & Mayer, Ltd.

(57) ABSTRACT

A method and an apparatus for determining a data flow rate on a service access port are provided. The method includes: acquiring data traffic information of existing service access ports; classifying the service access ports according to the data traffic information of the service access ports, and determining a data traffic model of a service access port of each class; and when it is determined that a new service access port is to be added to a network, determining a data traffic model corresponding to the new service access port that is to be added, and determining, according to the data traffic model corresponding to the new service access port that is to be added, a data flow rate on the new service access
(Continued)

port that is to be added, thus costs of determining a data flow rate on a new service data port to be added can be reduced.

18 Claims, 6 Drawing Sheets

(51) Int. Cl.
*H04L 12/26* (2006.01)
*H04W 24/08* (2009.01)
(52) U.S. Cl.
CPC ........ *H04L 41/145* (2013.01); *H04L 43/0894* (2013.01); *H04W 24/08* (2013.01)

(56) References Cited

U.S. PATENT DOCUMENTS

| | | | | |
|---|---|---|---|---|
| 7,543,052 | B1* | 6/2009 | Cesa Klein | H04L 43/026 709/223 |
| 2002/0107857 | A1* | 8/2002 | Teraslinna | H04L 12/5693 |
| 2004/0213165 | A1* | 10/2004 | Kola | H04L 69/16 370/252 |
| 2005/0026621 | A1* | 2/2005 | Febvre | H04B 7/18539 455/450 |
| 2006/0083231 | A1* | 4/2006 | Jeffay | H04L 43/026 370/389 |
| 2010/0046525 | A1* | 2/2010 | Gilmartin | H04L 12/4641 370/395.53 |
| 2011/0249685 | A1 | 10/2011 | Liang et al. | |
| 2013/0338990 | A1* | 12/2013 | He | H04L 41/145 703/13 |

FOREIGN PATENT DOCUMENTS

| | | |
|---|---|---|
| CN | 101547150 A | 9/2009 |
| CN | 101577681 A | 11/2009 |
| CN | 101997635 A | 3/2011 |
| CN | 102195985 A | 9/2011 |
| CN | 102204168 A | 9/2011 |
| CN | 102223308 A | 10/2011 |
| CN | 102724123 A | 10/2012 |
| CN | 102724317 A | 10/2012 |
| CN | 103702360 A | 4/2014 |
| EP | 2273737 A1 | 1/2011 |
| WO | WO 2008138247 A1 | 11/2008 |
| WO | WO 2011113386 A2 | 9/2011 |

OTHER PUBLICATIONS

Office Action in corresponding European Patent Application No. 14808803.2 (Jan. 19, 2017).

\* cited by examiner

METHOD AND APPARATUS FOR DETERMINING DATA FLOW RATE ON SERVICE ACCESS PORT

CROSS-REFERENCE TO RELATED APPLICATIONS

This application is a continuation of International Patent Application No. PCT/CN2014/080878, filed on Jun. 26, 2014, which claims priority to Chinese Patent Application No. 201310687399.0, filed on Dec. 12, 2013, both of which are hereby incorporated by reference in their entireties.

TECHNICAL FIELD

The present disclosure relates to the field of communications technologies and, in particular, to a method and an apparatus for determining a data flow rate on a service access port.

BACKGROUND

With gradual development of Internet Protocol (IP) network technologies, an increasing number of services are transmitted by using an IP network, where the services include third generation mobile communications (3G) services, VIP private line services, wireless local area network (Wireless LAN, WLAN) services, Long Term Evolution (LTE) services, and the like. A networking structure of a typical bearer network in an IP network is shown in FIG. 1. Service data enters a network though a service access port 1, and a ring-shape networking structure is used in the network, including an access ring, an aggregation ring, and a core ring. Intra-ring lines are connected through intra-ring ports, rings are connected through inter-ring ports, and the service data is transmitted through the intra-ring lines of the rings and the inter-ring ports.

According to different services to which a service access port accesses, various types of ports may be used, such as an Ethernet port and an asynchronous transfer mode (ATM) port. In order to construct a network on a premise that the network is properly planned, a data flow rate on a new service access port that is to be added is generally simulated in a planning phase, and an impact on the bearer network after the new service access port is added is further analyzed. In the prior art, a data flow rate on a service access port is simulated by collecting information about a demand of using a network form a user, which leads to higher costs; and because a collected user sample not only has a random feature, but is also incapable of fully reflecting an actual network using situation of the user, accuracy of a simulated result is relatively low.

SUMMARY

Embodiments of the present disclosure provide a method and an apparatus for determining a data flow rate on a service access port, so as to solve a current problem that costs for simulating a data flow rate on a service access port are relatively high and accuracy of a simulation result is relatively low, which is caused by collecting information about a demand of using a network from a user.

Specific solutions provided in the embodiments of the present disclosure are as follows:

According to a first aspect, a method for determining a data flow rate on a service access port includes:

acquiring data traffic information of existing service access ports;

classifying the service access ports into classes according to the data traffic information of the service access ports;

determining, for each class, a data traffic model of the service access ports in the class; and when it is determined that a new service access port is to be added to a network, determining a data traffic model corresponding to the new service access port that is to be added, and determining, according to the data traffic model corresponding to the new service access port that is to be added, a data flow rate on the new service access port that is to be added.

With reference to the first aspect, in a first possible implementation manner, the classifying the service access ports into classes according to the data traffic information of the service access ports includes:

classifying the data traffic information of the service access ports according to a time period;

determining a proportion of data traffic on each service access port in each sub-time period of each time period to all data traffic in each time period; and classifying the service access ports according to the proportions of data traffic on the service access ports in the sub-time periods of the time periods to all data traffic in the time periods.

With reference to the first possible implementation manner of the first aspect, in a second possible implementation manner, the classifying the service access ports according to the proportions of data traffic on the service access ports in the sub-time periods of the time periods to all data traffic in the time periods includes:

determining, according to the proportions of data traffic on the service access ports in the sub-time periods of the time periods to all data traffic in the time periods, a classification result that is corresponding to each time period and that is of the service access ports separately; and determining classification results of the service access ports according to the classification results that are corresponding to the time periods separately and that are of the service access ports, where the number of times for which service access ports are classified into a same class in the classification results is greater than a preset value, wherein the classification results are corresponding to the time periods, and the service access ports are classified into a same class or different classes in each classification result corresponding to each time period.

With reference to the second possible implementation manner of the first aspect, in a third possible implementation manner, the determining, according to the proportions of data traffic on the service access ports in the sub-time periods of the time periods to all data traffic on the service access ports in the time period, a classification result that is corresponding to each time period and that is of each service access port includes:

determining, according to the proportions of data traffic on the service access ports in the sub-time periods of the time periods to all data traffic in the time periods, the classification result that is corresponding to each time period and that is of each service access port by using a clustering algorithm.

With reference to the first possible implementation manner of the first aspect, in a fourth possible implementation manner, the determining a data traffic model of a service access port of a class includes:
  determining service access ports of a same class; and
  determining a data traffic model of the service access ports of the same class according to a proportion of data traffic on each service access port of the same class and in each sub-time period of each time period to all data traffic in each time period; where:
    the data traffic model of the service access ports of the same class includes the proportions of data traffic on the service access ports of the same class in the sub-time periods of the time periods to all data traffic in the time periods.

With reference to the fourth possible implementation manner of the first aspect, in a fifth possible implementation manner, the determining a data traffic model of the service access ports of the same class according to a proportion of data traffic on each service access port of the same class and in each sub-time period of each time period to all data traffic in each time period includes:
  determining an average of the proportions of data traffic on the service access ports of the same class and in the sub-time periods of the time periods to all data traffic in the time periods; and
  using the average of the proportions of data traffic on the service access ports of the same class and in the sub-time periods of the time periods to all data traffic in the time periods as the data traffic model of the service access ports of the same class.

With reference to the fourth possible implementation manner of the first aspect, in a sixth possible implementation manner, the determining, according to the data traffic model corresponding to the new service access port that is to be added, a data flow rate on the new service access port that is to be added includes:
  determining, according to the data traffic model corresponding to the new service access port that is to be added, a proportion of data traffic on the new service access port that is to be added and in each sub-time period of a specified time period to all data traffic in the specified time period; and
  determining a peak flow rate on the new service access port that is to be added and in the specified time period;
  determining a ratio relationship between a greatest value and the peak flow rate on the new service access port that is to be added and in the specified time period, where the greatest value is a greatest value in the proportions of data traffic on the new service access port that is to be added and in the sub-time periods of the specified time period to all data traffic in the specified time period;
  determining, according to the proportions of data traffic on the new service access port that is to be added and in the sub-time periods of the specified time period to all data traffic in the specified time period and the ratio relationship, a data flow rate on the new service access port that is to be added in each sub-time period of the specified time period separately; and
  using an accumulated value of the determined data flow rates in the sub-time periods as a data flow rate on the new service access port that is to be added and in the specified time.

With reference to the first aspect, in a seventh possible implementation manner, after the determining the data flow rates on the new service access port that is to be added, the method further includes:
  acquiring intra-ring data flow rate information of a network ring in which the new service access port that is to be added is located;
  determining, by adding the intra-ring data flow rate of the network ring and the data flow rate on the new service access port that is to be added, an intra-ring data flow rate of the network ring after the new service access port is added; and
  determining, according to the intra-ring data flow rate of the network ring after the new service access port is added, a peak flow rate of the network ring after the new service access port is added.

With reference to the seventh possible implementation manner of the first aspect, in an eighth possible implementation manner, the network ring includes:
  an access ring, an aggregation ring, or a backbone ring.

With reference to the first aspect, in a ninth possible implementation manner, the determining a data traffic model corresponding to the new service access port that is to be added includes:
  determining port attribute information of the existing service access ports corresponding to each data traffic model; and determine port attribute information of the new service access port that is to be added; and
  determining, according to the port attribute information of the existing service access ports corresponding to each data traffic model and the port attribute information of the new service access port that is to be added, the data traffic model corresponding to the new service access port that is to be added.

According to a second aspect, an apparatus for determining a data flow rate on a service access port includes:
  an information acquiring unit, configured to acquire data traffic information of existing service access ports;
  a feature determining unit, configured to classify the service access ports into classes according to the data traffic information of the service access ports, and determine, for each class, a data traffic model of the service access ports in the class; and
  a flow rate determining unit, configured to determine, when it is determined that a new service access port is to be added to a network, a data traffic model corresponding to the new service access port that is to be added, and determine, according to the data traffic model corresponding to the new service access port that is to be added, a data flow rate on the new service access port that is to be added.

With reference to the second aspect, in a first possible implementation manner, when configured to classify the service access ports into classes according to the data traffic information of the service access ports, the feature determining unit is configured to:
  classify the data traffic information of the service access ports according to a time period;
  determine a proportion of data traffic on each service access port in each sub-time period of each time period to all data traffic in each time period; and
  classify the service access ports according to the proportions of data traffic on the service access ports in the sub-time periods of the time periods to all data traffic in the time periods.

With reference to the first possible implementation manner of the second aspect, in a second possible implementation manner, when configured to classify the service access ports according to the proportions of data traffic on the service access ports in the sub-time periods of the time periods to all data traffic in the time periods, the feature determining unit is configured to:

determine, according to the proportions of data traffic on the service access ports in the sub-time periods of the time periods to all data traffic in the time periods, a classification result that is corresponding to each time period and that is of each service access port; and determine classification results of the service access ports according to the classification results that are corresponding to the time periods separately and that are of the service access ports, where the number of times for which service access ports are classified into a same class in the classification results is greater than a preset value, wherein the classification results are corresponding to the time periods, and the service access ports are classified into a same class or different classes in each classification result corresponding to each time period.

With reference to the second possible implementation manner of the second aspect, in a third possible implementation manner, when configured to determine, according to the proportions of data traffic on the service access ports in the sub-time periods of the time periods to all data traffic in the time periods, the classification result that is corresponding to each time period and that is of each service access port, the feature determining unit is configured to:

determine, according to the proportions of data traffic on the service access ports in the sub-time periods of the time periods to all data traffic in the time periods, the classification result that is corresponding to each time period and that is of each service access port by using a clustering algorithm.

With reference to the first possible implementation manner of the second aspect, in a fourth possible implementation manner, when configured to determine the data traffic model of the service access port of a class, the feature determining unit is configured to:

determine service access ports of a same class; and determine a data traffic model of the service access ports of the same class according to a proportion of data traffic on each service access port of the same class and in each sub-time period of each time period to all data traffic in each time period; where:

the data traffic model of the service access ports of the same class includes the proportions of data traffic on the service access ports of the same class in the sub-time periods of the time periods to all data traffic in the time periods.

With reference to the fourth possible implementation manner of the second aspect, in a fifth possible implementation manner, when configured to determine the data traffic model of the service access ports of the same class according to the proportions of data traffic on the service access ports of the same class and in the sub-time periods of the time periods to all data traffic in the time periods, the feature determining unit is configured to:

determine an average of the proportions of data traffic on the service access ports of the same class and in the sub-time periods of the time periods to all data traffic in the time periods; and use the average of the proportions of data traffic on the service access ports of the same class and in the sub-time periods of the time periods to all data traffic in the time periods as the data traffic model of the service access ports of the same class.

With reference to the fourth possible implementation manner of the second aspect, in a sixth possible implementation manner, when configured to determine, according to the data traffic model corresponding to the new service access port that is to be added, the data flow rate on the service access port that is to be added, the flow rate determining unit is configured to:

determine, according to the data traffic model corresponding to the new service access port that is to be added, a proportion of data traffic on the new service access port that is to be added and in each sub-time period of a specified time period to all data traffic in the specified time period; and determine a peak flow rate on the new service access port that is to be added and in the specified time period;

determine a ratio relationship between a greatest value and the peak flow rate on the new service access port that is to be added and in the specified time period, where the greatest value is a greatest value in the proportions of data traffic on the new service access port that is to be added and in the sub-time periods of the specified time period to all data traffic in the specified time period;

determine, according to the proportions of data traffic on the new service access port that is to be added and in the sub-time periods of the specified time period to all data traffic in the specified time period and the ratio relationship, a data flow rate on the new service access port that is to be added in each sub-time period of the specified time period separately; and use an accumulated value of the determined data flow rates in the sub-time periods as a data flow rate on the new service access port that is to be added and in the specified time.

With reference to the second aspect, in a seventh possible implementation manner, the apparatus further includes a network ring flow rate determining unit, and the network ring flow rate determining unit is configured to:

acquire intra-ring data flow rate information of a network ring in which the new service access port that is to be added is located;

determine, by adding the intra-ring data flow rate of the network ring and the data flow rate on the new service access port that is to be added, an intra-ring data flow rate of the network ring after the new service access port is added; and determine, according to the intra-ring data flow rate of the network ring after the new service access port is added, a peak flow rate of the network ring after the new service access port is added.

With reference to the seventh possible implementation manner of the second aspect, in an eighth possible implementation manner, the network ring includes:

an access ring, an aggregation ring, or a backbone ring.

With reference to the second aspect, in a ninth possible implementation manner, when configured to determine a data traffic model corresponding to the new service access port that is to be added, the flow rate determining unit is configured to:

determine port attribute information of the existing service access ports corresponding to each data traffic model; and determine port attribute information of the new service access port that is to be added; and determine, according to the port attribute information of the existing service access ports corresponding to each data traffic model and the port attribute information of the new service access port that is to be added, the data traffic model corresponding to the new service access port that is to be added.

According to a third aspect, an apparatus for determining a data flow rate on a service access port includes a processor, and the processor is configured to:
- acquire data traffic information of existing service access ports;
- classify the service access ports according to the data traffic information of the service access ports, and determine a data traffic model of a service access port of each class; and
- when it is determined that a new service access port is to be added to a network, determine a data traffic model corresponding to the new service access port that is to be added, and determine, according to the data traffic model corresponding to the new service access port that is to be added, a data flow rate on the new service access port that is to be added.

With reference to the third aspect, in a first possible implementation manner, when configured to classify the service access ports according to the data traffic information of the service access ports, the processor is configured to:
- classify the data traffic information of the service access ports according to a time period;
- determine a proportion of data traffic on each service access port in each sub-time period of each time period to all data traffic in each time period; and
- classify the service access ports according to the proportions of data traffic on the service access ports in the sub-time periods of the time periods to all data traffic in the time periods.

With reference to the first possible implementation manner of the third aspect, in a second possible implementation manner, when configured to classify the service access ports according to the proportions of data traffic on the service access ports in the sub-time periods of the time periods to all data traffic in the time periods, the processor is configured to:
- determine, according to the proportions of data traffic on the service access ports in the sub-time periods of the time periods to all data traffic in the time periods, a classification result that is corresponding to each time period and that is of each service access port; and
- determine classification results of the service access ports according to the classification results that are corresponding to the time periods separately and that are of the service access ports, where the number of times for which service access ports are classified into a same class in the classification results is greater than a preset value, wherein the classification results are corresponding to the time periods, and the service access ports are classified into a same class or different classes in each classification result corresponding to each time period.

With reference to the second possible implementation manner of the third aspect, in a third possible implementation manner, when configured to determine, according to the proportions of data traffic on the service access ports in the sub-time periods of the time periods to all data traffic in the time periods, the classification result that is corresponding to each time period and that is of each service access port, the processor is configured to:
- determine, according to the proportions of data traffic on the service access ports in the sub-time periods of the time periods to all data traffic in the time periods, the classification result that is corresponding to each time period and that is of each service access port by using a clustering algorithm.

With reference to the first possible implementation manner of the third aspect, in a fourth possible implementation manner, when configured to determine the data traffic model of the service access port of each class, the processor is configured to:
- determine service access ports of a same class; and
- determine a data traffic model of the service access ports of the same class according to a proportion of data traffic on each service access port of the same class and in each sub-time period of each time period to all data traffic in each time period; where:
- the data traffic model of the service access ports of the same class includes the proportions of data traffic on the service access ports of the same class in the sub-time periods of the time periods to all data traffic in the time periods.

With reference to the fourth possible implementation manner of the third aspect, in a fifth possible implementation manner, when configured to determine the data traffic model of the service access ports of the same class according to the proportions of data traffic on the service access ports of the same class and in the sub-time periods of the time periods to all data traffic in the time periods, the processor is configured to:
- determine an average of the proportions of data traffic on the service access ports of the same class and in the sub-time periods of the time periods to all data traffic in the time periods; and
- use the average of the proportions of data traffic on the service access ports of the same class and in the sub-time periods of the time periods to all data traffic in the time periods as the data traffic model of the service access ports of the same class.

With reference to the fourth possible implementation manner of the third aspect, in a sixth possible implementation manner, when configured to determine, according to the data traffic model corresponding to the new service access port that is to be added, the data flow rate on the service access port that is to be added, the processor is configured to:
- determine, according to the data traffic model corresponding to the new service access port that is to be added, a proportion of data traffic on the new service access port that is to be added and in each sub-time period of a specified time period to all data traffic in the specified time period;
- determine a peak flow rate on the new service access port that is to be added and in the specified time period;
- determine a ratio relationship between a greatest value and the peak flow rate on the new service access port that is to be added and in the specified time period, where the greatest value is a greatest value in the proportions of data traffic on the new service access port that is to be added and in the sub-time periods of the specified time period to all data traffic in the specified time period;
- determine, according to the proportions of data traffic on the new service access port that is to be added and in the sub-time periods of the specified time period to all data traffic in the specified time period and the ratio relationship, a data flow rate on the new service access port that is to be added in each sub-time period of the specified time period separately; and
- use an accumulated value of the determined data flow rates in the sub-time periods as a data flow rate on the new service access port that is to be added and in the specified time.

With reference to the third aspect, in a seventh possible implementation manner, after being configured to determine a data flow rate on the new service access port that is to be added, the processor is further configured to:

acquire intra-ring data flow rate information of a network ring in which the new service access port that is to be added is located;

determine, by adding the intra-ring data flow rate of the network ring and the data flow rate on the new service access port that is to be added, an intra-ring data flow rate of the network ring after a new service access port is added; and determine, according to the intra-ring data flow rate of the network ring after the new service access port is added, a peak flow rate of the network ring after the new service access port is added.

With reference to the seventh possible implementation manner of the third aspect, in an eighth possible implementation manner, the network ring includes:

an access ring, an aggregation ring, or a backbone ring.

With reference to the third aspect, in a ninth possible implementation manner, when configured to determine a data traffic model corresponding to the new service access port that is to be added, the processor is configured to:

determine port attribute information of the existing service access ports corresponding to each data traffic model; and determine port attribute information of the new service access port that is to be added; and determine, according to the port attribute information of the existing service access ports corresponding to each data traffic model and the port attribute information of the new service access port that is to be added, the data traffic model corresponding to the new service access port that is to be added.

In the embodiments of the present disclosure, data traffic information of existing service access ports is acquired, the service access ports are classified according to the data traffic information of the service access port, and a data traffic model of a service access port of each class is determined. Compared with a method of obtaining a data traffic model by statistics according to information about a demand of using a network of a user, a solution for determining a data flow rate on a service access port provided in the embodiments of the present disclosure avoids collecting the information about the demand of using a network of a user, thereby requiring lower costs, and avoids determining a data traffic model according to inaccurate information about a demand of a user, so as to improve accuracy of predicting, by simulation, a data flow rate on a new service access port.

DESCRIPTION OF EMBODIMENTS

Embodiments of the present disclosure provide a method and an apparatus for determining a data flow rate on a service access port, thereby reducing costs of simulating a data flow rate on a new service access port that is to be added and improving accuracy of predicting, by simulation, the data flow rate on the new service access port.

Figure 1:
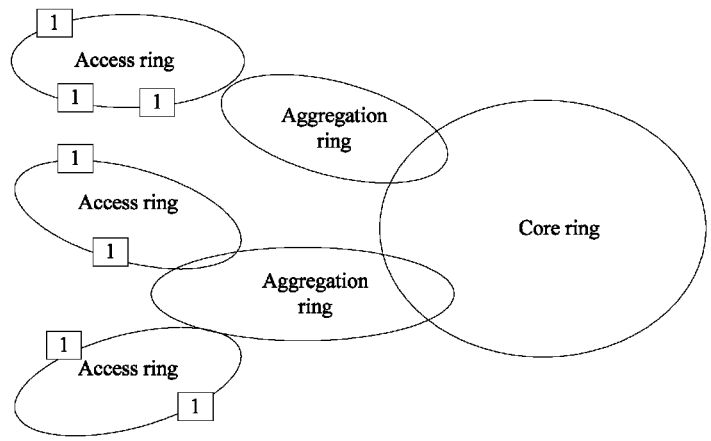
FIG. 1 is a schematic diagram of a networking structure of a bearer network.
Figure 2:
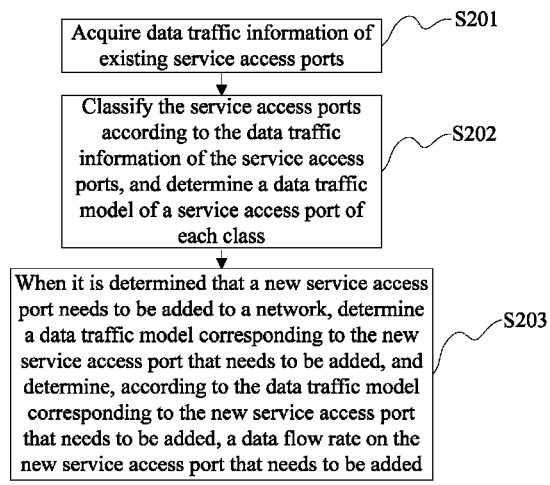
FIG. 2 is a schematic flowchart of a method for determining a data flow rate on a service access port according to an embodiment of the present disclosure.

Referring to FIG. 2, a method for determining a data flow rate provided in an embodiment of the present disclosure includes:

S201: Acquire data traffic information of existing service access ports.

The service access ports may include the following classes: a second generation mobile communications (second generation, 2G) service access port, a 3G service access port, an LTE service access port, a WLAN service access port, a home customer service access port, and a corporate customer service access port.

Specifically, in step S201, the data traffic information of the service access ports is acquired by counting statistics on accumulated data traffic on the service access ports once every preset time length.

S202: Classify the service access ports according to the data traffic information of the service access ports, and determine a data traffic model of a service access port of each class.

The data traffic information of the service access ports depends on factors, such as a user group use habit and a user quantity in a place where the service access port is located, and a class of the service access ports. Despite that different service access ports have different data traffic information, some service access ports have some common features in the data traffic information. Home customer Ethernet ports distributed in different residential areas are used as an example. Generally these ports have less traffic in daytime from Mondays to Fridays, but more traffic from Monday nights to Friday nights and on Saturdays and Sundays. A traffic peak in a week generally occurs on a Friday night or a Saturday night, and even specific time points at which peaks of these ports occur are also close. Service access ports that have a great number of common features of the data traffic information can be classified into one class by analysis and calculation. Further, data traffic information of service access ports of a same class is analyzed and calculated to determine a data traffic model of the service access ports of this class.

Figure 3:
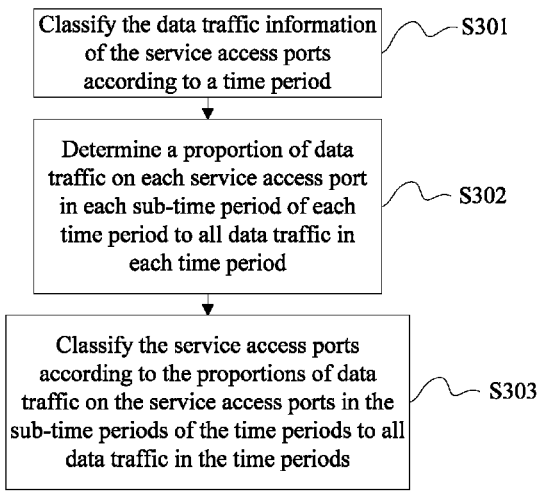
FIG. 3 and FIG. 4 are schematic flowcharts of a method for classifying service access ports according to an embodiment of the present disclosure.

Preferably, the classifying the service access ports according to the data traffic information of the service access ports in step S202, as shown in FIG. 3, specifically includes the following steps:

S301: Classify the data traffic information of the service access ports according to a time period.

S302: Determine a proportion of data traffic on each service access port in each sub-time period of each time period to all data traffic in each time period.

Traffic volumes of the service access ports are different from each other, which causes that a common feature of the data traffic information is not obvious, so that it is difficult to perform classification directly. Therefore, the data traffic information of the service access ports needs to be classified according to the time period first. Then, only after data traffic information in each sub-time period of each time period is represented by a proportion of the data traffic to all traffic in each time period, can the service access ports be classified by using a related classification algorithm and according to the time period.

A specific example is as follows: For a service access port A, a granularity of a time period is a day and a granularity of a sub-time period is 15 minutes, and if all traffic in a day is 1000 M, traffic in an $m^{th}$ 15 minutes is 50 M, and traffic in an $n^{th}$ 15 minutes is 100 M, the traffic in the $m^{th}$ 15 minutes is recorded as 5% and the traffic in the $n^{th}$ 15 minutes is recorded as 10%.

S303: Classify the service access ports according to the proportions of data traffic on the service access ports in the sub-time periods of the time periods to all data traffic in the time periods.

Figure 4:
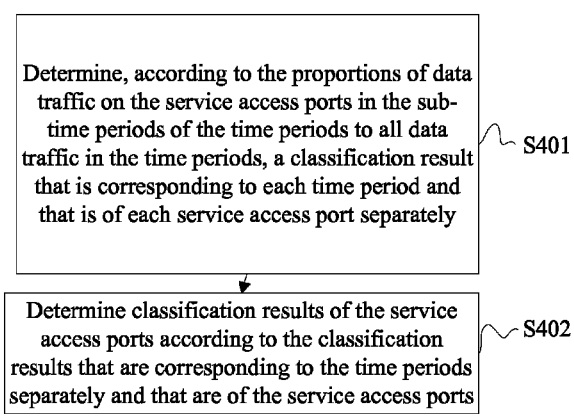

As shown in FIG. 4, step S303 specifically includes the following steps:

S401: Determine, according to the proportions of data traffic on the service access ports in the sub-time periods of the time periods to all data traffic in the time periods, a classification result that is corresponding to each time period and that is of each service access port.

For example: There are seven service access ports A, B, C, D, E, F, and G, the granularity of the time period is a day, and the granularity of a sub-time period is 15 minutes. After a proportion of data traffic on each service access port in each 15 minutes to all data traffic in the day is obtained, service access ports with a same or similar circumstance of proportions that are distributed according to time are classified into one class.

Classification results are shown as follows:

a classification result in a first day: A, B, and C are classified into a class, D and E are classified into a class, and F and G are classified into a class;

a classification result in a second day: A and B are classified into a class, C, D, and E are classified into a class, and F and G are classified into a class; and a classification result in a third day: A and B are classified into a class, D and E are classified into a class, and C, F, and G are classified into a class.

Specifically, the classification algorithm used in step S302 may be a clustering algorithm.

S402: Determine classification results of the service access ports according to the classification results that are corresponding to the time periods separately and that are of the service access ports.

The classification results corresponding to the time periods are not necessarily the same, and therefore, a final classification result needs to be obtained statistically according to all classification results. In order that service access ports, which are classified into a same class for multiple times, can be classified into one class, in the final classification result of the service access ports, the number of times for which service access ports are classified into a same class in the classification results should be greater than a preset value, wherein the classification results are corresponding to the time periods, and the service access ports are classified into a same class or different classes in each classification result corresponding to each time period.

The example in step S401 is used for describing this step. If it is required that the service access ports which are classified into the same class in the final classification result be classified into a same class in every day's classification results, the final classification result is that: A and B are classified into a class, D and E are classified into a class, and F and G are classified into a class; and C, as an unstable service access port, is not classified into any class.

Generally, surrounding environment of service access ports that are finally classified into a same class is the same, for example, the service access ports are all deployed in a residential area, all deployed in a development area, or all deployed in a business district, and port classes are also the same, for example, all being Ethernet ports or all being 3G base station ports; and the information is pre-recorded in port attribute information of the service access ports.

Further, in step S202, the determining a data traffic model of a service access port of each class includes: determining service access ports of a same class; and determining a data traffic model of the service access ports of the same class according to a proportion of data traffic on each service access port of the same class and in each sub-time period of each time period to all data traffic in each time period, where the data traffic model of the service access ports of the same class includes the proportions of data traffic on the service access ports of the same class in the sub-time periods of the time periods to all data traffic in the time periods.

Specifically, the determining a data traffic model of the service access ports of the same class according to a proportion of data traffic on each service access port of the same class and in each sub-time period of each time period to all data traffic in each time period includes: determining an average of the proportions of data traffic on the service access ports of the same class and in the sub-time periods of the time periods to all data traffic in the time periods; and using the average of the proportions of data traffic on the service access ports of the same class and in the sub-time periods of the time periods to all data traffic in the time periods as the data traffic model of the service access ports of the same class. For example: If service access ports A and B are classified into a same class, a proportion of data traffic on the service access ports A and B in a sub-time period of a time period to all data traffic in the time period are 4.1% and 4.3% respectively, then, in a finally obtained data traffic model, a proportion of data traffic in the sub-time period of the time period to all data traffic in the time period is 4.2%, an average of the two; an average of proportions of data traffic on the service access ports of a same class and in each sub-time period of each time period to all data traffic in the time period are determined according to this manner, and the averages of these proportions form a data traffic model of the service access ports of this class.

In addition, the data traffic model of the service access ports of the same class may be further processed, so as to average and combine data traffic models with a relatively close feature in different time periods, thereby reducing the number of data traffic models. For example: On a premise that a granularity of a time period is a day, given that traffic distribution features are relatively close from Monday to Friday, data traffic models of the service access ports of the same class from Monday to Friday are averaged and combined, so as to obtain a workday data traffic model of the service access ports of this class.

S203: When it is determined that a new service access port is to be added to a network, determine a data traffic model corresponding to the new service access port that is to be added, and determine, according to the data traffic model corresponding to the new service access port that is to be added, a data flow rate on the new service access port that is to be added.

Because port attribute information of the new service port that is to be added, such as environment information and a port class, is determined, a peak flow rate of the new service access port that is to be added may be predicted according to these determined factors. In addition, according to the port attribute information of the existing service access ports corresponding to each data traffic model determined in step S202 and the port attribute information of the new service access port that is to be added, the data traffic model corresponding to the new service access port that is to be added may also be determined. For example: Service access ports corresponding to a data traffic model 1 include a service access port A, a service access port B, and a service access port C, and that A, B, and C are distributed in a school and that a port class is an Ethernet port are recorded in port attribute information of the service access ports A, B, and C; if a new service access port D that is added is also distributed in the school and with a port class of Ethernet, the service access port D may use the data traffic model 1.

Preferably, the determining, according to the data traffic model corresponding to the new service access port that is to be added, a data flow rate on the new service access port that is to be added includes: determining, according to the data traffic model corresponding to the new service access port that is to be added, a proportion of data traffic on the new service access port that is to be added and in each sub-time period in a specified time period to all data traffic in the specified time period; and determining a peak flow rate on the new service access port that is to be added and in the specified time period; determining a ratio relationship between a greatest value and the peak flow rate on the new service access port that is to be added and in the specified time period, where the greatest value is a greatest value in the proportions of data traffic on the new service access port that is to be added and in the sub-time periods of the specified time period to all data traffic in the specified time period; determining, according to the proportions of data traffic on the new service access port that is to be added and in the sub-time periods of the specified time period to all data traffic in the specified time period and the ratio relationship, a data flow rate on a new service access port in each sub-time period of the specified time period separately; and using an accumulated value of the determined data flow rates in the sub-time periods as the data flow rate on the new service access port that is to be added and in the specified time.

A specific example of determining the data flow rate on the new service access port that is to be added is as follows:

It is known that, a peak flow rate on the new service access port that is to be added on Monday is 100 Mbit/s, a Monday data traffic model corresponding to the service access port predicts a proportion of traffic in every 15 minutes of Monday to traffic in the whole day, or a workday data traffic model corresponding to the service access port predicts a proportion of traffic in every 15 minutes of Monday to traffic in the whole day, and it is determined, according to the data traffic model corresponding to the service access port, that traffic in an $m^{th}$ 15 minutes on Monday accounts for 20% of the traffic in the whole day, which is greater than any proportion of traffic in any other 15 minutes to the traffic in the day and reaches a peak proportion; and it is determined that, in a same day, traffic in an $n^{th}$ 15 minutes accounts for 5% of the traffic in the whole day. Therefore, the peak flow rate should occur in the $m^{th}$ 15 minutes, that is, a flow rate in the $m^{th}$ 15 minutes is 100 Mbit/s. Then, according to a ratio relationship between the peak proportion 20% and the peak flow rate 100 Mbit/s, it may be calculated that a flow rate in the $n^{th}$ 15 minutes is (100/20)*5=25 Mbit/s. Similarly, a date flow rate on the service access port in any 15 minutes of a same day may be calculated according to the ratio relationship.

Figure 5:
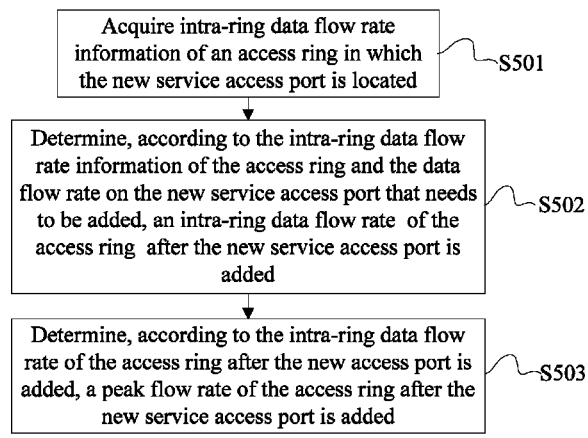
FIG. 5 is a schematic flowchart of determining a data flow rate of an access ring after a new service access port is added according to an embodiment of the present disclosure.

In an actual application, because peak flow rates on service access ports occur at different time points, a sum of peak flow rates on a new service access port that is to be added and in a network is not equal to a newly added peak flow rate of a bearer network. In this way, an impact brought by the new service access port that is to be added to the bearer network cannot be determined. Currently, a method generally used is that, the sum of peak flow rates on the new service access port is multiplied by a fixed decimal, and an obtained result is used as the newly added peak flow rate of the bearer network. This manner cannot be integrated with an actual circumstance, which causes that variation of the peak flow rate of the bearer network cannot be predicted accurately, and further causes a bandwidth bottleneck because many service access ports are constructed, or causes a bandwidth waste because service access ports are few. However, in this embodiment of the present disclosure, a data flow rate on a new service access port in each time period can be determined, and a specific impact brought by the new service access port to the bearer network can be further determined, thereby contributing to proper planning of network construction. Specific content of this embodiment is as follows:

As shown in FIG. 5, after the data flow rate on the new service access port that is to be added is determined, steps of determining an impact brought by the new service access port to an access ring include:

S501: Acquire intra-ring data flow rate information of an access ring in which the new service access port is located.

S502: Add an intra-ring data flow rate of the access ring and the data flow rate on the new service access port that is to be added, so as to obtain an intra-ring data flow rate of the access ring after the new service access port is added.

S503: Determine, according to the intra-ring data flow rate of the access ring after the new access port is added, a peak flow rate of the access ring after the new service access port is added.

Preferably, intra-ring bandwidth utilization may further be determined according to an intra-ring peak flow rate; and the bandwidth utilization=(the peak flow rate/intra-ring bandwidth)*100%.

When it is determined that bandwidth utilization of the access ring after the new service access port is added is less than a first threshold, it is considered that the service access port can be constructed; and when it is determined that the bandwidth utilization of the access ring after the new service access port is added is greater than the first threshold, it is considered that the service access port cannot be constructed, or access ring bandwidth needs to be improved because the bearer network may be under too much pressure after the service access port is constructed.

Figure 6:
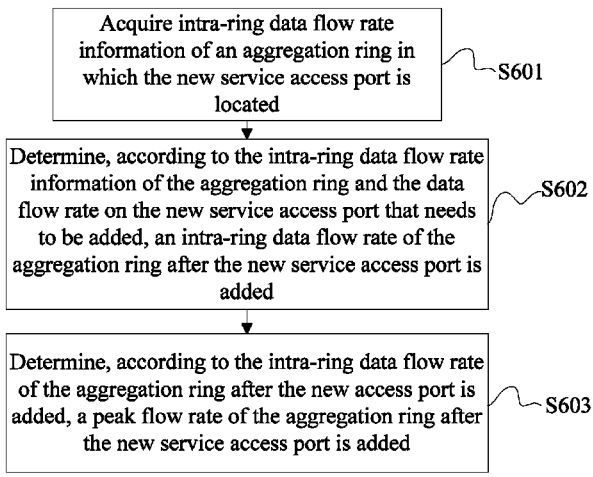
FIG. 6 is a schematic flowchart of determining a data flow rate of an aggregation ring after a new service access port is added according to an embodiment of the present disclosure.

As shown in FIG. 6, after the data flow rate on the new service access port that is to be added is determined, steps of determining an impact brought by the new service access port to an aggregation ring include:

S601: Acquire intra-ring data flow rate information of an aggregation ring in which the new service access port is located.

S602: Add an intra-ring data flow rate of the aggregation ring and the data flow rate on the new service access port that is to be added, so as to obtain an intra-ring data flow rate of the aggregation ring after the new service access port is added.

S603: Determine, according to the intra-ring data flow rate of the aggregation ring after the new access port is added, a peak flow rate of the aggregation ring after the new service access port is added.

Preferably, intra-ring bandwidth utilization may further be determined according to an intra-ring peak flow rate.

When it is determined that bandwidth utilization of the aggregation ring after the new service access port is added is less than a second threshold, it is considered that the service access port can be constructed; and when it is determined that the bandwidth utilization of the aggregation ring after the new service access port is added is greater than the second threshold, it is considered that the service access port cannot be constructed, or aggregation ring bandwidth needs to be improved because the bearer network may be under too much pressure after the service access port is constructed.

Figure 7:
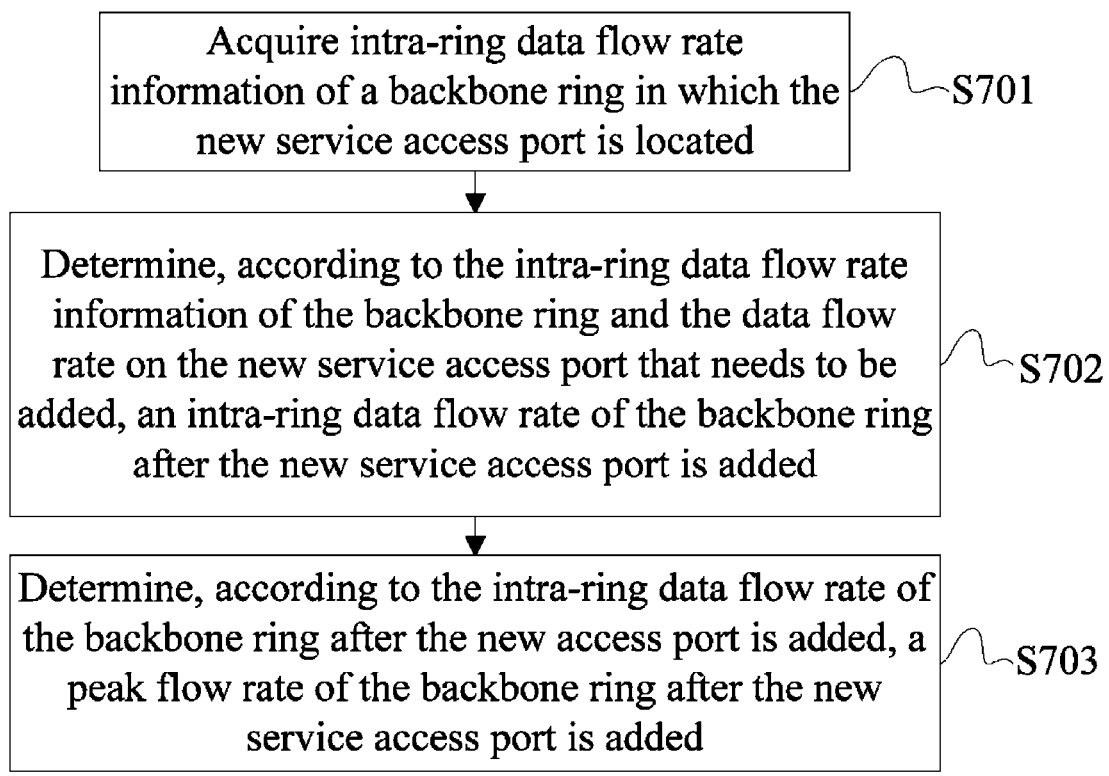
FIG. 7 is a schematic flowchart of determining a data flow rate of a backbone ring after a new service access port is added according to an embodiment of the present disclosure.

As shown in FIG. 7, after the data flow rate on the new service access port that is to be added is determined, steps of determining an impact brought by the new service access port to a backbone ring include:

S701: Acquire intra-ring data flow rate information of a backbone ring in which the new service access port is located.

S702: Add an intra-ring data flow rate of the backbone ring and the data flow rate on the new service access port that is to be added, so as to obtain an intra-ring data flow rate of the backbone ring after the new service access port is added.

S703: Determine, according to the intra-ring data flow rate of the backbone ring after the new service access port is added, a peak flow rate of the backbone ring after the new service access port is added.

Preferably, intra-ring bandwidth utilization may further be determined according to an intra-ring peak flow rate.

When it is determined that bandwidth utilization of the backbone ring after the new service access port is added is less than a third threshold, it is considered that the service access port can be constructed; and when it is determined that the bandwidth utilization of the backbone ring after the new service access port is added is greater than the third threshold, it is considered that the service access port cannot be constructed, or backbone ring bandwidth needs to be improved because the bearer network may be under too much pressure after the service access port is constructed.

In this way, bearing variation of each ring line in the bearer network can be determined according to the data flow rate on the new service access port, thereby providing a reference for planning of network construction.

In this embodiment, an impact brought by a new service access port to each ring line is determined, which may further help to implement optimization of deploying the service access port. For example, service access ports of a same access ring are deployed in different environment as far as possible, so that peak data flow rates of the service access ports can occur on different time, and in this way, an increase amplitude of a peak flow rate on each ring line of the bearer network can be reduced, and utilization of a network line resource is improved.

In addition, in this embodiment of the present disclosure, automatic collection of data traffic information of existing service access ports in a current network is implemented, and according to the data traffic information of the existing service ports in the current network, a data flow rate on a new service access port that is to be added is simulated; and when a user behavior changes, for example, in a case in which data traffic of 3G base station is increasingly used with the popularity of all kinds of smart phone applications, the data traffic information of the current network can be recollected in real time for simulation, so as to obtain a data traffic model with timeliness.

Figure 8:
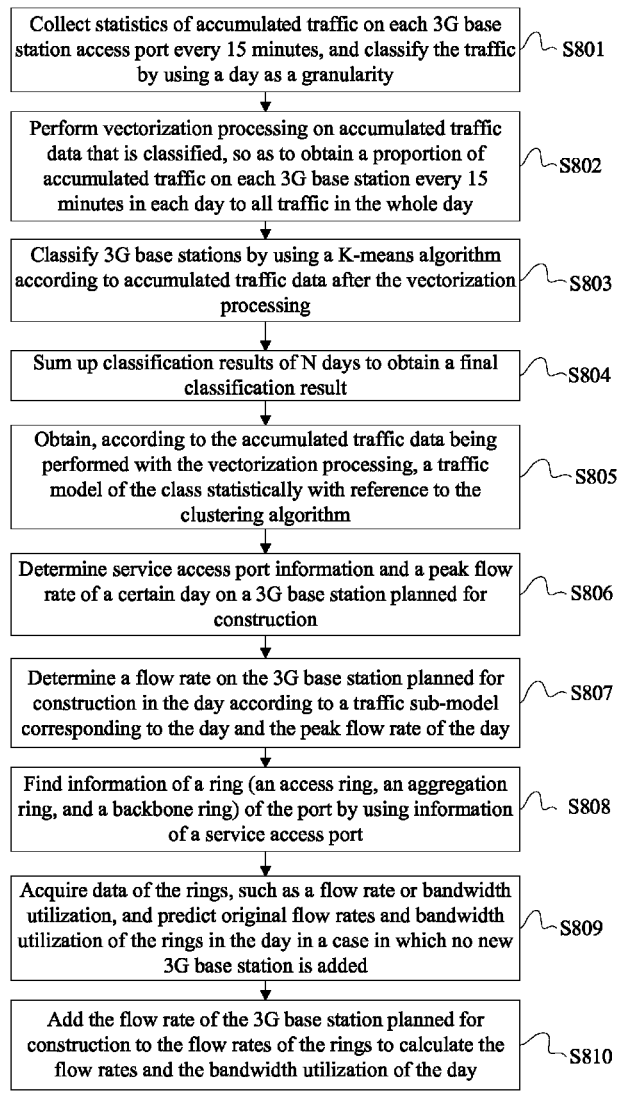
FIG. 8 is a schematic flowchart according to a specific embodiment of the present disclosure.

The following provides a specific embodiment of the present disclosure with reference to an application scenario of planning 3G base station construction; and as shown in FIG. 8, the following content is specifically included:

S801: Collect statistics of accumulated traffic on each 3G base station access port every 15 minutes, and classify the traffic by using a day as a granularity.

S802: Perform vectorization processing on accumulated traffic data that is classified, so as to obtain a proportion of accumulated traffic on each 3G base station every 15 minutes in each day to all traffic in the whole day.

S803: Classify the 3G base stations by using a K-means (K-means) algorithm according to accumulated traffic data after the vectorization processing, where the K-means algorithm is one type of clustering algorithm.

S804: Sum up classification results of N days to obtain a final classification result.

S805: Obtain, according to the accumulated traffic data being performed with the vectorization processing, a data traffic model of the class statistically with reference to the clustering algorithm, where the data traffic model includes: a workday data traffic sub-model, a weekend data traffic sub-model, and a holiday data traffic sub-model.

S806: Determine service access port information and a peak flow rate of a day on a 3G base station planned for construction.

S807: Determine a flow rate on the 3G base station planned for construction in the day according to a traffic sub-model corresponding to the day and the peak flow rate of the day.

S808: Find information about a ring (an access ring, an aggregation ring, and a backbone ring) of the port by using information about a service access port.

S809: Acquire data of the rings, such as a flow rate or bandwidth utilization, and predict original flow rates and bandwidth utilization of the rings in the day in a case in which no new 3G base station is added; for example, if the day is a workday, predict the original flow rates of the rings by calculating an average of flow rates of the rings in the day.

Figure 9:
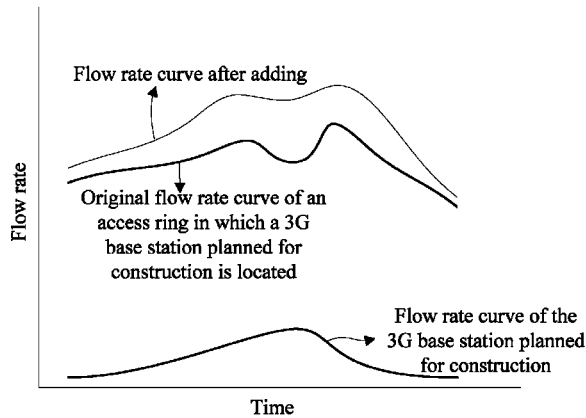
FIG. 9 is a schematic diagram of a process of adding data flow rates of an access ring according to a specific embodiment of the present disclosure.

S810: Add the flow rate of the 3G base station planned for construction to the flow rates of the rings to calculate the flow rates and the bandwidth utilization of the day, where an adding process of flow rates of an access ring is shown in FIG. 9.

According to the forgoing procedures, a flow rate of a 3G base station planned for construction in any day, and flow rates and bandwidth utilization of rings after a new 3G base station is added and in any day can be determined.

Figure 10:
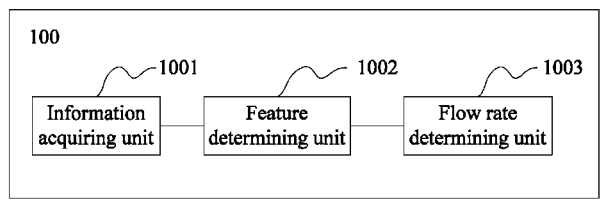
FIG. 10 is a schematic structural diagram of an apparatus for determining a data flow rate on a service access port according to an embodiment of the present disclosure.

Referring to FIG. 10, an embodiment of the present disclosure provides an apparatus 100 for determining a data flow rate on a service access port, where the apparatus 100 includes:

an information acquiring unit 1001, configured to acquire data traffic information of existing service access ports;

a feature determining unit 1002, configured to classify the service access ports according to the data traffic information of the service access ports, and determine a data traffic model of a service access port of each class; and a flow rate determining unit 1003, configured to determine, when it is determined that a new service access port is to be added to a network, a data traffic model corresponding to the new service access port that is to be added, and determine, according to the data traffic model corresponding to the new service access port that is to be added, a data flow rate on the new service access port that is to be added.

Preferably, when configured to classify the service access ports according to the data traffic information of the service access ports, the feature determining unit 1002 is specifically configured to:

classify the data traffic information of the service access ports according to a time period;

determine a proportion of data traffic on each service access port in each sub-time period of each time period to all data traffic in each time period; and classify the service access ports according to the proportions of data traffic on the service access ports in the sub-time periods of the time periods to all data traffic in the time periods.

Preferably, when configured to classify the service access ports according to the proportions of data traffic on the service access ports in the sub-time periods of the time periods to all data traffic in the time periods, the feature determining unit 1002 is specifically configured to:

determine, according to the proportions of data traffic on the service access ports in the sub-time periods of the time periods to all data traffic in the time periods, a classification result that is corresponding to each time period and that is of each service access port; and determine classification results of the service access ports according to the classification results that are corresponding to the time periods and that are of the service access ports, where the number of times for which service access ports are classified into a same class in the classification results is greater than a preset value, wherein the classification results are corresponding to the time periods, and the service access ports are classified into a same class or different classes in each classification result corresponding to each time period.

Preferably, when configured to determine, according to the proportions of data traffic on the service access ports in the sub-time periods of the time periods to all data traffic in the time periods, the classification result that is corresponding to each time period and that is of each service access port, the feature determining unit 1002 is specifically configured to:

determine, according to the proportions of data traffic on the service access ports in the sub-time periods of the time periods to all data traffic in the time periods, the classification result that is corresponding to each time period and is of each service access port by using a clustering algorithm.

Preferably, when configured to determine the data traffic model of the service access port of each class, the feature determining unit 1002 is specifically configured to:

determine service access ports of a same class; and determine a data traffic model of the service access ports of the same class according to a proportion of data traffic on each service access port of the same class and in each sub-time period of each time period to all data traffic in each time period; where:

the data traffic model of the service access ports of the same class includes the proportions of data traffic on the service access ports of the same class in the sub-time periods of the time periods to all data traffic in the time periods.

Preferably, when configured to determine the data traffic model of the service access ports of the same class according to the proportions of data traffic on the service access ports of the same class and in the sub-time periods of the time periods to all data traffic in the time periods, the feature determining unit 1002 is specifically configured to:

determine an average of the proportions of data traffic on the service access ports of the same class and in the sub-time periods of the time periods to all data traffic in the time periods; and use the average of the proportions of data traffic on the service access ports of the same class and in the sub-time periods of the time periods to all data traffic in the time periods as the data traffic model of the service access ports of the same class.

Preferably, when configured to determine, according to the data traffic model corresponding to the new service access port that is to be added, the data flow rate on the service access port that is to be added, the flow rate determining unit 1003 is specifically configured to:

determine, according to the data traffic model corresponding to the new service access port that is to be added, a proportion of data traffic on the new service access port that is to be added and in each sub-time period of a specified time period to all data traffic in the specified time period;

determine a peak flow rate on the new service access port that is to be added and in the specified time period;

determine a ratio relationship between a greatest value and the peak flow rate on the new service access port that is to be added and in the specified time period, where the greatest value is a greatest value in the proportions of data traffic on the new service access port that is to be added and in the sub-time periods of the specified time period to all data traffic in the specified time period;

determine, according to the proportions of data traffic on the new service access port that is to be added and in the sub-time periods of the specified time period to all data traffic in the specified time period and the ratio relationship, a data flow rate on the new service access port that is to be added in each sub-time period of the specified time period separately; and use an accumulated value of the determined data flow rates in the sub-time periods as a data flow rate on the new service access port that is to be added and in the specified time.

Preferably, the apparatus further includes a network ring data flow determining unit, configured to:

acquire intra-ring data flow rate information of a network ring in which the new service access port that is to be added is located;

determine, by adding the intra-ring data flow rate of the network ring and the data flow rate on the new service access port that is to be added, an intra-ring data flow rate of the network ring after the new service access port is added; and determine, according to the intra-ring data flow rate of the network ring after the new service access port is added, a peak flow rate of the network ring after the new service access port is added.

The network ring includes:
an access ring, an aggregation ring, or a backbone ring.

Preferably, when configured to determine the data traffic model corresponding to the new service access port that is to be added, the flow rate determining unit is specifically configured to:

determine port attribute information of the existing service access ports corresponding to each data traffic model; and determine port attribute information of the new service access port that is to be added; and determine, according to the port attribute information of the existing service access ports corresponding to each data traffic model and the port attribute information of the new service access port that is to be added, the data traffic model corresponding to the new service access port that is to be added.

It should be noted that, the apparatus for determining a data flow rate on a service access port according to this embodiment is to implement the foregoing steps S201 to S203, and the explanation of and the limitation on the foregoing method also be applied to the apparatus for determining a data flow rate on a service access port according to this embodiment.

Figure 11:
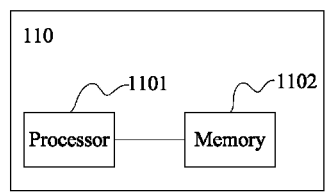
FIG. 11 is another schematic structural diagram of an apparatus for determining a data flow rate on a service access port according to an embodiment of the present disclosure.

Referring to FIG. 11, an embodiment of the present disclosure provides an apparatus 110 for determining a data flow rate on a service access port, including a processor 1101 and a memory 1102, where the processor 1101 is configured to:

acquire data traffic information of existing service access ports;

classify the service access ports according to the data traffic information of the service access ports, and determine a data traffic model of a service access port of each class; and when it is determined that a new service access port is to be added to a network, determine a data traffic model corresponding to the new service access port that is to be added, and determine, according to the data traffic model corresponding to the new service access port that is to be added, a data flow rate on the new service access port that is to be added.

The memory 1102 is configured to store the data traffic information of the existing service access ports.

Preferably, when configured to classify the service access ports according to the data traffic information of the service access ports, the processor 1101 is specifically configured to:

classify the data traffic information of the service access ports according to a time period;

determine a proportion of data traffic on each service access port in each sub-time period of each time period to all data traffic in each time period; and classify the service access ports according to the proportions of data traffic on the service access ports in the sub-time periods of the time periods to all data traffic in the time periods.

Preferably, when configured to classify the service access ports according to the proportions of data traffic on the service access ports in the sub-time periods of the time periods to all data traffic in the time periods, the processor 1101 is specifically configured to:

determine, according to the proportions of data traffic on the service access ports in the sub-time periods of the time periods to all data traffic in the time periods, a classification result that is corresponding to each time period and that is of each service access port; and determine classification results of the service access ports according to the classification results that are corresponding to the time periods and that are of the service access ports, where the number of times for which service access ports are classified into a same class in the classification results is greater than a preset value, wherein the classification results are corresponding to the time periods, and the service access ports are classified into a same class or different classes in each classification result corresponding to each time period.

Preferably, when configured to determine, according to the proportions of data traffic on the service access ports in the sub-time periods of the time periods to all data traffic in the time periods, the classification result that is corresponding to each time period and that is of each service access port, the processor 1101 is specifically configured to:

determine, according to the proportions of data traffic on the service access ports in the sub-time periods of the time periods to all data traffic in the time periods, the classification result that is corresponding to each time period and is of each service access port by using a clustering algorithm.

Preferably, when configured to determine the data traffic model of the service access port of each class, the processor 1101 is specifically configured to:

determine service access ports of a same class; and determine a data traffic model of the service access ports of the same class according to a proportion of data traffic on each service access port of the same class and in each sub-time period of each time period to all data traffic in each time period; where:

the data traffic model of the service access ports of the same class includes the proportions of data traffic on the service access ports of the same class in the sub-time periods of the time periods to all data traffic in the time periods.

Preferably, when configured to determine the data traffic model of the service access ports of the same class according to the proportions of data traffic on the service access ports of the same class and in the sub-time periods of the time periods to all data traffic in the time periods, the processor 1101 is specifically configured to:

determine an average of the proportions of data traffic on the service access ports of the same class and in the sub-time periods of the time periods to all data traffic in the time periods; and use the average of the proportions of data traffic on the service access ports of the same class and in the sub-time periods of the time periods to all data traffic in the time periods as the data traffic model of the service access ports of the same class.

Preferably, when configured to determine, according to the data traffic model corresponding to the new service access port that is to be added, the data flow rate on the service access port that is to be added, the processor 1101 is specifically configured to:

determine, according to the data traffic model corresponding to the new service access port that is to be added, a proportion of data traffic on the new service access port that is to be added and in each sub-time period of a specified time period to all data traffic in the specified time period;

determine a peak flow rate on the new service access port that is to be added and in the specified time period;

determine a ratio relationship between a greatest value and the peak flow rate on the new service access port that is to be added and in the specified time period, where the greatest value is a greatest value in the proportions of data traffic on the new service access port that is to be added and in the sub-time periods of the specified time period to all data traffic in the specified time period;

determine, according to the proportions of data traffic on the new service access port that is to be added and in the sub-time periods of the specified time period to all data traffic in the specified time period and the ratio relationship, a data flow rate on the new service access port that is to be added in each sub-time period of the specified time period separately; and use an accumulated value of the determined data flow rates in the sub-time periods as a data flow rate on the new service access port that is to be added and in the specified time.

Preferably, after being configured to determine the data flow rate on the new service access port that is to be added, the processor 1101 is further configured to:

acquire intra-ring data flow rate information of a network ring in which the new service access port that is to be added is located;

determine, by adding the intra-ring data flow rate of the network ring and the data flow rate on the new service access port that is to be added, an intra-ring data flow rate of the network ring after the new service access port is added; and determine, according to the intra-ring data flow rate of the network ring after the new service access port is added, a peak flow rate of the network ring after the new service access port is added.

The network ring includes:

an access ring, an aggregation ring, or a backbone ring.

Preferably, when configured to determine the data traffic model corresponding to the new service access port that is to be added, the processor 1101 is specifically configured to:

determine port attribute information of the existing service access ports corresponding to each data traffic model; and determine port attribute information of the new service access port that is to be added; and determine, according to the port attribute information of the existing service access ports corresponding to each data traffic model and the port attribute information of the new service access port that is to be added, the data traffic model corresponding to the new service access port that is to be added.

In conclusion, the embodiments of the present provide a method and an apparatus for determining a data flow rate on a service access port, which are capable of automatically collecting data traffic of each service access port and determining a data traffic model of the service access ports, thereby reducing costs of determining a data flow rate on a new service access port that is to be added with higher accuracy and providing basis for planning of a whole network; because a period of collecting the traffic data of the service access ports is short, rapid updating of the data traffic model of the service access ports can be achieved and timeliness of the data traffic model can be improved; in addition, an optimized service access port deployment solution in a network can be determined according to the method and apparatus provided in the embodiments of the present disclosure.

A person skilled in the art should understand that the embodiments of the present disclosure may be provided as a method, a system, or a computer program product. Therefore, the present application may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is apparent that a person skilled in the art can make various modifications and variations to the present disclosure without departing from the spirit and scope of the present disclosure. The present disclosure is intended to cover these modifications and variations provided that they fall within the scope of protection defined by the following claims or their equivalent technologies.

What is claimed is:

1. A method for determining a data flow rate on a service access port, comprising:

acquiring data traffic information of existing service access ports;

classifying the service access ports into classes according to the data traffic information of the service access ports;

determining, for each class, a data traffic model of the service access ports in the class;

in response to determining that a new service access port is to be added to a network, determining a data traffic model corresponding to the new service access port that is to be added; and determining, according to the data traffic model corresponding to the new service access port that is to be added, a data flow rate on the new service access port that is to be added, wherein the classifying the service access ports into classes according to the data traffic information of the service access ports comprises:

classifying the data traffic information of the service access ports according to a time period;

determining a proportion of data traffic on each service access port in each sub-time period of each time period to all data traffic in each time period; and classifying the service access ports according to the proportions of data traffic on the service access ports in the sub-time periods of the time periods to all data traffic in the time periods.

2. The method according to claim 1, wherein the classifying the service access ports according to the proportions of data traffic on the service access ports in the sub-time periods of the time periods to all data traffic in the time periods comprises:

determining, according to the proportions of data traffic on the service access ports in the sub-time periods of the time periods to all data traffic in the time periods, a classification result that is corresponding to each time period and that is of each service access port; and determining classification results of the service access ports according to the classification results that are corresponding to the time periods and that are of the service access ports, wherein the number of times for which service access ports are classified into a same class in the classification results is greater than a preset value, wherein the classification results are corresponding to the time periods, and the service access ports are classified into a same class or different classes in each classification result corresponding to each time period.

3. The method according to claim 2, wherein the determining, according to the proportions of data traffic on the service access ports in the sub-time periods of the time periods to all data traffic in the time periods, a classification result that is corresponding to each time period and that is of each service access port comprises:

determining, according to the proportions of data traffic on the service access ports in the sub-time periods of the time periods to all data traffic in the time periods, the classification result that is corresponding to each time period and that is of each service access port by using a clustering algorithm.

4. The method according to claim 1, wherein the determining a data traffic model of a service access port of a class comprises:

determining service access ports of a same class; and determining a data traffic model of the service access ports of the same class according to a proportion of data traffic on each service access port of the same class and in each sub-time period of each time period to all data traffic in each time period; wherein:

the data traffic model of the service access ports of the same class comprises the proportions of data traffic on the service access ports of the same class in the sub-time periods of the time periods to all data traffic in the time periods.

5. The method according to claim 4, wherein the determining a data traffic model of the service access ports of the same class according to a proportion of data traffic on each service access port of the same class and in each sub-time period of each time period to all data traffic in each time period comprises:

determining an average of the proportions of data traffic on the service access ports of the same class and in the sub-time periods of the time periods to all data traffic in the time periods; and using the average of the proportions of data traffic on the service access ports of the same class and in the sub-time periods of the time periods to all data traffic in the time periods as the data traffic model of the service access ports of the same class.

6. The method according to claim 4, wherein the determining, according to the data traffic model corresponding to the new service access port that is to be added, a data flow rate on the new service access port that is to be added comprises:

determining, according to the data traffic model corresponding to the new service access port that is to be added, a proportion of data traffic on the new service access port that is to be added and in each sub-time period of a specified time period to all data traffic in the specified time period; and determining a peak flow rate on the new service access port that is to be added and in the specified time period;

determining a ratio relationship between a greatest value and the peak flow rate on the new service access port that is to be added and in the specified time period, wherein the greatest value is a greatest value in the proportions of data traffic on the new service access port that is to be added and in the sub-time periods of the specified time period to all data traffic in the specified time period;

determining, according to the proportions of data traffic on the new service access port that is to be added and in the sub-time periods of the specified time period to all data traffic in the specified time period and the ratio relationship, a data flow rate on the new service access port that is to be added in each sub-time period of the specified time period separately; and using an accumulated value of the determined data flow rates in the sub-time periods as a data flow rate on the new service access port that is to be added and in the specified time.

7. The method according to claim 1, wherein the determining the data traffic model corresponding to the new service access port that is to be added comprises:

determining port attribute information of the existing service access ports corresponding to each data traffic model; and determining port attribute information of the new service access port that is to be added; and determining, according to the port attribute information of the existing service access ports corresponding to each data traffic model and the port attribute information of the new service access port that is to be added, the data traffic model corresponding to the new service access port that is to be added.

8. An apparatus for determining a data flow rate on a service access port, comprising:

a processor; and a memory storing instructions that, when executed by the processor, cause the apparatus to perform the steps of:

acquiring data traffic information of existing service access ports;

classifying the service access ports into classes according to the data traffic information of the service access ports, and determining, for each class, a data traffic model of the service access ports in the class; and in response to determining that a new service access port is to be added to a network, determining a data traffic model corresponding to the new service access port that is to be added; and determining, according to the data traffic model corresponding to the new service access port that is to be added, a data flow rate on the new service access port that is to be added, wherein classifying the service access ports into classes according to the data traffic information of the service access ports comprises:

classifying the data traffic information of the service access ports according to a time period;

determining a proportion of data traffic on each service access port in each sub-time period of each time period to all data traffic in each time period; and classifying the service access ports according to the proportions of data traffic on the service access ports in the sub-time periods of the time periods to all data traffic in the time periods.

9. The apparatus according to claim 8, wherein the classifying the service access ports according to the proportions of data traffic on the service access ports in the sub-time periods of the time periods to all data traffic in the time periods comprises:

determining, according to the proportions of data traffic on the service access ports in the sub-time periods of the time periods to all data traffic in the time periods, a classification result that is corresponding to each time period and that is of each service access port; and determining classification results of the service access ports according to the classification results that are corresponding to the time periods separately and that are of the service access ports, wherein the number of times for which service access ports are classified into a same class in the classification results is greater than a preset value, wherein the classification results are corresponding to the time periods, and the service access ports are classified into a same class or different classes in each classification result corresponding to each time period.

10. The apparatus according to claim 9, wherein the determining, according to the proportions of data traffic on the service access ports in the sub-time periods of the time periods to all data traffic in the time periods, the classification result that is corresponding to each time period and that is of each service access pore comprises:

determining, according to the proportions of data traffic on the service access ports in the sub-time periods of the time periods to all data traffic in the time periods, the classification result that is corresponding to each time period and that is of each service access port by using a clustering algorithm.

11. The apparatus according to claim 8, wherein the determining the data traffic model of the service access port of a class comprises:

determining service access ports of a same class; and determining a data traffic model of the service access ports of the same class according to a proportion of data traffic on each service access port of the same class and in each sub-time period of each time period to all data traffic in each time period; wherein:

the data traffic model of the service access ports of the same class comprises the proportions of data traffic on the service access ports of the same class in the sub-time periods of the time periods to all data traffic in the time periods.

12. The apparatus according to claim 11, wherein the determining the data traffic model of the service access ports of the same class according to the proportions of data traffic on the service access ports of the same class and in the sub-time periods of the time periods to all data traffic in the time periods comprises:

determining an average of the proportions of data traffic on the service access ports of the same class and in the sub-time periods of the time periods to all data traffic in the time periods; and using the average of the proportions of data traffic on the service access ports of the same class and in the sub-time periods of the time periods to all data traffic in the time periods as the data traffic model of the service access ports of the same class.

13. The apparatus according to claim 11, wherein the determining, according to the data traffic model corresponding to the new service access port that is to be added, the data flow rate on the service access port that is to be added comprises: the flow rate determining unit is configured to:

determining, according to the data traffic model corresponding to the new service access port that is to be added, a proportion of data traffic on the new service access port that is to be added and in each sub-time period of a specified time period to all data traffic in the specified time period;

determining a peak flow rate on the new service access port that is to be added and in the specified time period;

determining a ratio relationship between a greatest value and the peak flow rate on the new service access port that is to be added and in the specified time period, wherein the greatest value is a greatest value in the proportions of data traffic on the new service access port that is to be added and in the sub-time periods of the specified time period to all data traffic in the specified time period;

determining, according to the proportions of data traffic on the new service access port that is to be added and in the sub-time periods of the specified time period to all data traffic in the specified time period and the ratio relationship, a data flow rate on the new service access port that is to be added in each sub-time period of the specified time period separately; and using an accumulated value of the determined data flow rates in the sub-time periods as a data flow rate on the new service access port that is to be added and in the specified time.

14. The apparatus according to claim 8, wherein the determining the data traffic model corresponding to the new service access port that is to be added comprises:

determining port attribute information of the existing service access ports corresponding to each data traffic model, and determining port attribute information of the new service access port that is to be added; and determining, according to the port attribute information of the existing service access ports corresponding to each data traffic model and the port attribute information of the new service access port that is to be added, the data traffic model corresponding to the new service access port that is to be added.

15. A method for determining a data flow rate on a service access port, comprising:

acquiring data traffic information of existing service access ports;

classifying the service access ports into classes according to the data traffic information of the service access ports;

determining, for each class, a data traffic model of the service access ports in the class;

in response to determining that a new service access port is to be added to a network, determining a data traffic model corresponding to the new service access port that is to be added; and determining, according to the data traffic model corresponding to the new service access port that is to be added, a data flow rate on the new service access port that is to be added, wherein after the determining the data flow rate on the new service access port that is to be added, the method further comprises:

acquiring intra-ring data flow rate information of a network ring in which the new service access port that is to be added is located;

determining, by adding the intra-ring data flow rate of the network ring and the data flow rate on the new service access port that is to be added, an intra-ring data flow rate of the network ring after the new service access port is added; and determining, according to the intra-ring data flow rate of the network ring after the new service access port is added, a peak flow rate of the network ring after the new service access port is added.

16. The method according to claim 15, wherein the network ring comprises:

an access ring, an aggregation ring, or a backbone ring.

17. An apparatus for determining a data flow rate on a service access port, comprising:

a processor; and a memory storing instructions that, when executed by the processor, cause the apparatus to perform the steps of:

acquiring data traffic information of existing service access ports;

classifying the service access ports into classes according to the data traffic information of the service access ports, and determining, for each class, a data traffic model of the service access ports in the class;

in response to determining that a new service access port is to be added to a network, determining a data traffic model corresponding to the new service access port that is to be added; and determining, according to the data traffic model corresponding to the new service access port that is to be added, a data flow rate on the new service access port that is to be added, wherein after the determining the data flow rate on the new service access port that is to be added, the method further comprises:

acquiring intra-ring data flow rate information of a network ring in which the new service access port that is to be added is located;

determining, by adding the intra-ring data flow rate of the network ring and the data flow rate on the new service access port that is to be added, an intra-ring data flow rate of the network ring after the new service access port is added; and determining, according to the intra-ring data flow rate of the network ring after the new service access port is added, a peak flow rate of the network ring after the new service access port is added.

18. The apparatus according to claim 17, wherein the network ring comprises:

an access ring, an aggregation ring, or a backbone ring.

* * * * *

UNITED STATES PATENT AND TRADEMARK OFFICE
CERTIFICATE OF CORRECTION

PATENT NO. : 9,706,414 B2
APPLICATION NO. : 14/577062
DATED : July 11, 2017
INVENTOR(S) : Hu et al.

It is certified that error appears in the above-identified patent and that said Letters Patent is hereby corrected as shown below:

In the Claims

Column 25, Line 47, "access pore comprises" should read -- access port comprises --.

Column 26, Line 20, "the flow rate determining unit is configured to:" should be deleted.

Signed and Sealed this
Twentieth Day of March, 2018

Andrei Iancu
*Director of the United States Patent and Trademark Office*